US010549474B2

(12) United States Patent
Moore et al.

(10) Patent No.: US 10,549,474 B2
(45) Date of Patent: Feb. 4, 2020

(54) SYSTEMS AND METHODS FOR INTERLEAVING MATERIAL IN PRINTED ROLLED SUBSTRATE MATERIALS TO PREVENT OFFSET

(71) Applicant: XEROX Corporation, Norwalk, CT (US)

(72) Inventors: Steven Robert Moore, Pittsford, NY (US); Alexander J. Fioravanti, Penfield, NY (US); Xin Yang, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 559 days.

(21) Appl. No.: 15/165,203

(22) Filed: May 26, 2016

(65) Prior Publication Data
US 2017/0341291 A1   Nov. 30, 2017

(51) Int. Cl.
*B29C 51/26* (2006.01)
*B29C 51/02* (2006.01)
*B29K 23/00* (2006.01)
*B29L 9/00* (2006.01)
*B29L 31/00* (2006.01)

(52) U.S. Cl.
CPC ............ *B29C 51/264* (2013.01); *B29C 51/02* (2013.01); *B29C 51/261* (2013.01); *B29K 2023/0633* (2013.01); *B29K 2023/12* (2013.01); *B29K 2995/0053* (2013.01); *B29L 2009/005* (2013.01); *B29L 2031/712* (2013.01)

(58) Field of Classification Search
CPC ..... B29C 51/264; B29C 51/261; B29C 51/02; B29L 2031/712; B29L 2009/005; B29K 2023/12; B29K 2995/0053; B29K 2023/0633
See application file for complete search history.

(56) References Cited

U.S. PATENT DOCUMENTS 2,099,879 A  *  11/1937  Wooddell ................ B41F 22/00
                                                              101/420

* cited by examiner

*Primary Examiner* — Robert J Grun
(74) *Attorney, Agent, or Firm* — Caesar Rivise, PC

(57) ABSTRACT

A system and method are provided for implementing a process by which printed rolls of substrate material web have additional material layers interleaved between the rolled material web layers to substantially eliminate back transfer or roll offset of printed images on the back sides of the rolled material substrates. In a process for pre-printing thermoforming grade plastic materials to produce rolls of substrate material for use in a thermoforming process, ink compositions, particularly adapted for the thermoforming process, are deposited on substantially continuous webs of substrate material. The webs of substrate material are then re-rolled with separate layers of low surface energy substrate material interleaved between the layers of the printed substrate material in order to substantially eliminate imaging defects produced by back transfer of printed images on to the backs of layers of the printed substrate material stored in rolls.

24 Claims, 5 Drawing Sheets

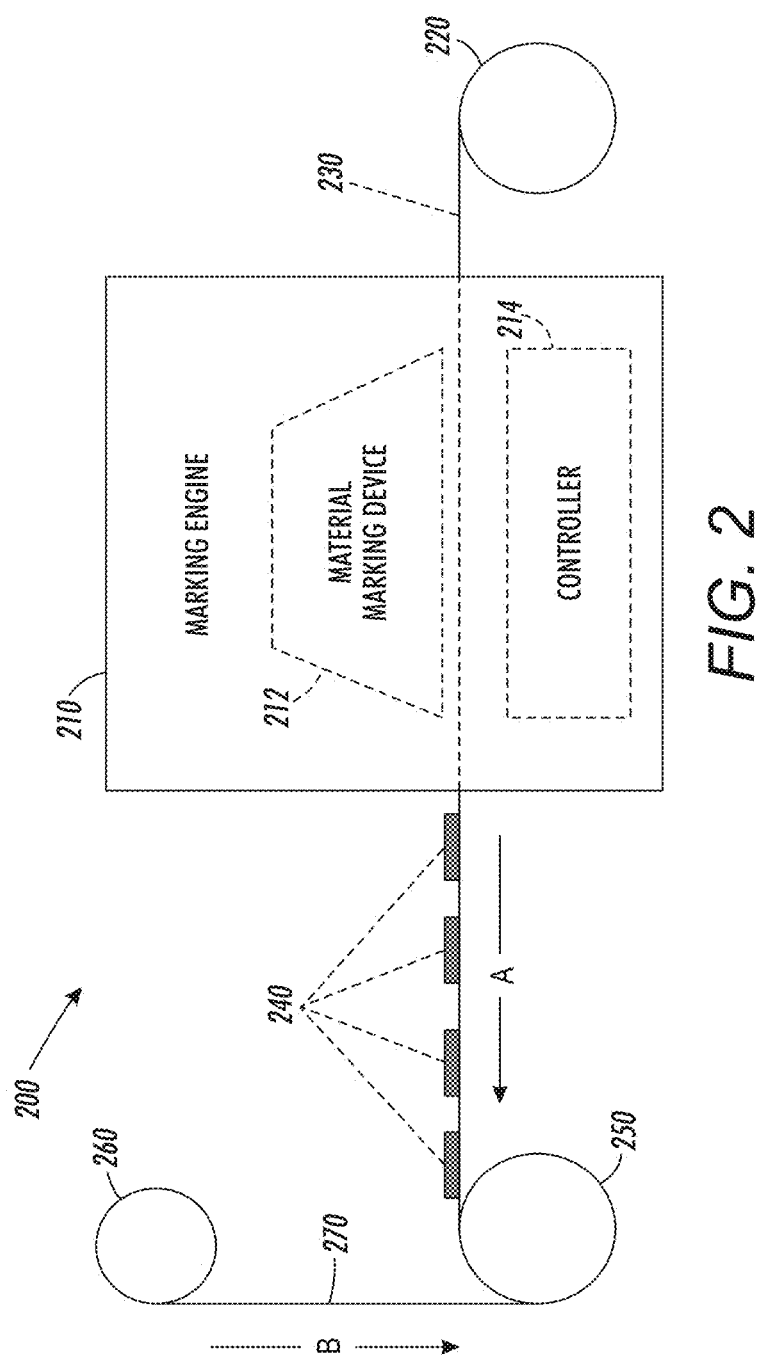

SYSTEMS AND METHODS FOR INTERLEAVING MATERIAL IN PRINTED ROLLED SUBSTRATE MATERIALS TO PREVENT OFFSET

BACKGROUND

1. Field of the Disclosed Embodiments

This disclosure relates to systems and methods for implementing a process by which printed rolls of substrate material web have additional material layers interleaved between the rolled material web layers to substantially eliminate back transfer or roll offset of printed images on the back sides of the rolled material substrates.

2. Related Art

In today's consumer marketplace, a broad spectrum of consumer goods are displayed and sold in varying configurations of thermoformed packaging, running a full spectrum from what are referred to as "blister packs" to formed plastic containers of virtually every shape and size. Thermoform containers have the advantage of being able to be shaped and/or sized to accommodate everything from foodstuffs to hardware/parts to batteries to children's toys, and the like. A quick trip through the aisles of any grocery store, hardware store or big-box convenience store reveals the broad array of plastic "formed" packaging that has substantially replaced cardboard and pressboard boxes, plastic and paper bags and other legacy material packaging.

Other advantages in the use of thermoform containers include an ability to provide attractive presentation of the packaging for display, and a capacity to ensure safety and protection of the packaged products in that the containers are generally sealable/resealable and leakproof, thereby allowing a certain reusability while keeping contaminants out of the packaging.

In very few applications are these advantages more noticeable than in the packaging of food items. Thermoform containers allow for safe handling of all sorts of food items and afford a certain convenience with regard to storage and food preparation. Foods in thermoform containers can go, for example and as appropriate, from the freezer directly into the microwave, and then directly onto the table in the same container, which may ultimately be resealed to put the leftovers back in the refrigerator. The widespread use of thermoform containers tends to extend the shelf life of the consumables within the containers. A variety of thermoform containers are typically used in grocery stores to package locally-prepared food items including baked goods prepared in the store's bakery, and ready-to-eat entrees, salads, meat and cheese spreads, and the like, from the store's deli. Fresh produce maybe sold in thermoform containers, and empty thermoform containers are often provided in grocery stores, and also in restaurants, as "take-out" containers. Finally, beverage bars and fast food establishments generally provide at least thermoform lids for dispensed beverages. As is indicated above, however, the use of thermoform containers is not strictly limited to storing foods.

Typically, thermoform containers are molded in a variety of heat based molding procedures from various types of plastic materials that are comparatively rigid when formed. These plastic materials may include mylar, polypropylene, polyvinyl chloride (PVC), polyethylene terephthalate (PET), and other like materials. The conventional thermoforming process involves heating a plastic substrate (or sheet), which may be typically input from a roll of a plastic substrate material web, to a pliable "forming" temperature. The heated plastic substrate is then formed to a specific shape while heated in a molding process. The molding process often imparts certain stretching to the heated plastic substrate as the heated plastic substrate is conformed to a mold or shape. The resultant molded shape may then be cooled to a point where the formed shape is no longer comparatively pliable so as to retain the formed shape in this comparatively less pliable or deformable state. Certain finishing steps may be undertaken such as, for example, trimming excess material from the formed shape to create a particular usable output thermoformed product.

In the forming process, the sheet of plastic film is heated in an oven to a high-enough temperature to permit it to be stretched into or onto the mold and then cooled to the finished shape. What is referred to as thin-gauge thermoforming is primarily usable to manufacture the types of thermoform containers generally referred to above including disposable cups, plastic containers, plastic container lids, plastic trays, blister packs, plastic-formed clamshells, and other products for storage, transport, display and reuse in the food/food services, medical, and general retail industries. This process and these uses are distinguished from what is separately referred to as thick-gauge thermoforming, which is principally used for forming more sizable and/or robust parts like vehicle door and dash panels, refrigerator liners, utility vehicle beds, plastic pallets, and the like. In many common processes for comparatively high-volume, continuous thermoforming of thin-gauge products, plastic sheets are fed from continuous rolls of a substrate material web.

Conventionally, paper, plastic and other forms of labeling are separately pre-printed. After the thermoformed objects are molded in a thermoforming step, the pre-printed labeling is often adhered, or otherwise affixed, to a surface of the thermoformed objects in a separate labeling step. A print process, and/or a print application, has emerged that is advantageously usable for printing labeling directly on particular types of packaging including thermoformed packaging. In the emerging process, the plastic material web actually forms the substrate to be printed, typically in rolls, which, once printed in a digital printing process, are then re-rolled to become the rolls of input material substrate for processing in a thermoforming device that is used to actually shape the packaging components from the now pre-printed substrate material web.

The emerging process has an advantage of broadening the latitude by which the labeling can be formed. The intent is generally to pre-print labels onto thermoforming grade plastic that is to be subsequently thermoformed into a container. In the emerging process, flexibility is provided by the use of a variety of typical digital image forming or printing processes, which may include jetted ink image forming or printing, instead of one or more of a conventional lithographic or gravure printing process.

A particular parameter that has emerged as being substantially critical to the success of the emerging image forming process is that an ultraviolet (or UV) curable ink set be capable of stretching with the substrate on which an image is formed using the ink in order to withstand the thermoforming process. When the substrate material is stretched during the thermoforming process, an ability of the ink to stretch and deform with the heated substrate material is generally necessary to ensure that the inked image does not crack or develop other defects affecting image quality in the thermoforming process.

In experimentation, the developers of the emerging image forming process found that ink formulations, or particular ink sets, that may be specifically adapted, or otherwise formulated, to stretch also exhibited a tendency for, and/or were prone to, "roll offset" failure, which is also typically referred to in the printing arts as "set-off." Those of skill in the art recognize that "set-off" is the term used most generally to define to the unwanted back transfer of ink from one printed sheet to another. It was found that printed areas on a roll of thermoform substrate material, which had been wound back up, would tend to transfer varying amounts of ink from the imaged surface so as to disadvantageously randomly mark a backside of the plastic substrate of the thermoform substrate material web. When the roll of thermoform substrate material web is then unwound for thermoforming, this failure, in the form of unwanted back transfer to a backside of the substrate material web, becomes evident. Not only does this unwanted set-off adversely affect the aesthetics of the thermoformed object, but for food and drug packaging applications, any observable amount of role offset is otherwise not acceptable.

In extensive experimentation, elimination of the unwanted roll offset was attempted by modifying the ink formulation. A number of surface treatments were also attempted. Food grade silicone oil was, for example, added over the ink in groups of experiments. Separately, anti-offset powder was tried along the lines of that which is used in lithography to mitigate set-off concerns. While having some effect, all of these varying attempts for eliminating roll offset through the manipulation of ink formulations, and/or addition of additive surface materials and surface material coatings, proved insufficient to ultimately or adequately prevent the roll offset from occurring.

SUMMARY OF DISCLOSED SUBJECT MATTER

Another manner by which unwanted set-off is sometimes avoided is by providing interleaved material substrates between printed substrates in order that any unwanted ink transfer that occurs is "caught" by a waste or otherwise discardable interleaved material sheet, often paper. In view of the above shortfalls, which manifested themselves during development of the emerging image forming process for pre-printing rolled substrate material webs for use in a thermoforming process, it would be advantageous to find some manner by which to adapt the concept of interleaved materials to eliminate the exhibited set-off problem.

Exemplary embodiments of the systems and methods according to this disclosure may provide a mechanism by which to form images directly on plastic substrate material webs and then to re-roll the plastic substrate material webs in a manner that interleaved material between the layers rolled material web to substantially avoid roll offset or set-off of image forming material onto a backside of the plastic substrate material webs when re-rolled.

Exemplary embodiments may implement digital printing of images on the plastic substrate material webs using standard digital image forming processes, including jetted ink printing or image forming.

Exemplary embodiments may jet UV-curable inks onto the plastic substrate material webs in a marking engine and then expose the deposited UV-curable inks to radiation to thereby cure the inked images onto the plastic substrate material webs.

In embodiments, the UV-curable inks may be pliable or stretchable enough such that they do not crack or otherwise deform as the substrate materials on which they are deposited and cured are stretched in a thermoforming process to produce labeled container components from the plastic substrate materials.

Exemplary embodiments may re-roll the substantially continuous web of plastic substrate material at an output of the marking engine in a manner that ensures that an interleaved material is placed between layers of the re-roll.

In embodiments, the interleaved material may be formed of a low surface energy material to resist back transfer, roll offset or set-off of the pliant UV-curable ink materials even to the interleaved material thereby substantially reducing an opportunity for development of imaging defects in the re-roll process.

An objective of the exemplary embodiments is to provide a web of pre-printed plastic substrate material to support a thermoforming process in a thermoforming machine, device or system. The end product of the thermoforming process is a pre-printed formed container that substantially eliminates a requirement for an additional labeling step in the finished container forming process.

The above and other features, and advantages, of the disclosed systems and methods are described in, or apparent from, the following detailed description of various exemplary embodiments.

BRIEF DESCRIPTION OF THE DRAWINGS

Various exemplary embodiments of the systems and methods for implementing a process by which printed rolls of substrate material webs have additional material layers interleaved between the rolled material layers in order to substantially eliminate back transfer or offset of printed images on the rolled material substrates, according to this disclosure, will be described, in detail, with reference to the following drawings, in which:

FIG. 2 illustrates a schematic diagram of an exemplary image forming device including a material interleaving unit according to this disclosure;

DETAILED DESCRIPTION OF EMBODIMENTS

Figure 1A:
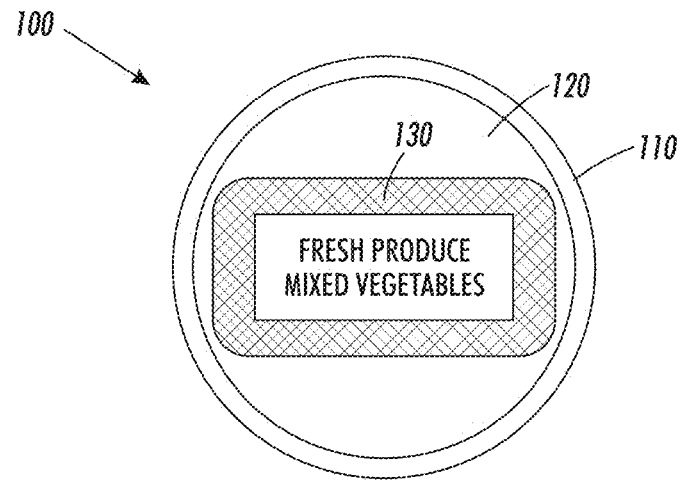
FIGS. 1A and 1B illustrate a top view and a side view, respectively, of an exemplary thermoform container that may be formed from a process that advantageously employs pre-printed substrates formed and re-rolled in a manner according to this disclosure.

The systems and methods for implementing a process by which printed rolls of substrate material webs have additional material layers interleaved between the rolled material layers in order to substantially eliminate back transfer or offset of printed images on the rolled material substrates, according to this disclosure, will generally refer to these specific utilities for those systems and methods. Exemplary embodiments described and depicted in this disclosure should not be interpreted as being specifically limited to any particular configuration a marking engine, individual material (ink) deposition and curing components in an image forming system, a thermoforming device for forming thermoform containers from rolls of pre-printed plastic material substrate webs, or control and/or processing components for controlling an image forming and re-rolling process for rolls of pre-printed substrate material webs in an image forming device, and/or for controlling a thermoforming process using such pre-printed material substrates to form the output thermoformed components. It should be recognized that any advantageous use of the systems and methods for unrolling, printing and re-rolling webs of substrate material with a particular (recoverable) interleaving web material dispersed between individual layers in the re-roll that employ devices and schemes such as those discussed in detail in this disclosure is contemplated as being included within the scope of the disclosed exemplary systems and methods.

The systems and methods according to this disclosure will be described as being particularly adaptable for use in printing rolls of plastic material substrate webs that may then be usable as an input in a pre-printed substrate thermoforming process including pre-printed labeling on the substrates from which the output thermoformed objects are formed. These references are meant to be illustrative only in providing a single real-world utility for the disclosed systems and methods, and should not be considered as limiting the disclosed systems and methods to any particular product, substrate web material, or combination of devices, or to any particular type of image forming system in which the described and depicted UV-curable inks, having a capacity to stretch with a heated pliant substrate material, may be deposited on such substrate material. Any commonly-known processor-controlled digital image forming device or process in which the processor may direct ink deposition and curing, and re-rolling of a substrate web for later use that may be adapted according to the specific capabilities discussed in this disclosure is contemplated.

The disclosed embodiments are intended, among other objectives, to provide an interleaved material between layers of re-rolled substrate web in a manner that substantially eliminates roll offset, or set-off, of image forming materials to a backside of a layer of the image forming substrate facing the imaged surface.

In experimentation, it was found that roll offset did not occur if the inked image formed surface was in contact with certain polymers, other than the amorphous PET that is generally used as a thermoforming substrate material. In particular, it was found that when the inked image formed surface was in contact with either low density polyethylene (LDPE) or bi-axially oriented polypropylene (BOPP), as examples, then roll offset did not occur. The surface energy of these materials is substantially lower than the surface energy of PET. As a result, the disclosed embodiments propose interleaving a layer of a low surface energy polymer with the printed PET or other thermoforming substrate material web as the printed PET or other substrate material is being rewound. This interleaving process substantially, and actually completely, prevents the ink from contacting a backside of the printed PET or other substrate material and thus prevents roll offset, or set-off, from occurring.

When the interleaved roll is unwound to feed into the thermoforming device, which may be in a form of a thermoforming press, the low surface energy material may, in embodiments, be separately rewound for reuse. It may be particularly advantageous to employ interleaved materials comprised of low surface energy materials. The mere presence of the low surface energy material prevents random and unwanted marking of a backside of the material substrate when it is re-rolled. It can be equally important, however, to ensure that there is no random transfer of the image from the imaged surface to the interleaved material in order that image quality of the pre-printed substrate material is not adversely affected.

According to the disclosed schemes, the re-rolled pre-printed composite rolls including the interleaved material may be transferred to the thermoforming device (or press) to provide the input material for the thermoforming process. In the thermoforming process, the pre-printed plastic substrate web is fed directly to the thermoforming device while the interleaved material may be recovered (including being re-rolled) outside an input of the thermoforming device (or press) in order that the interleaved material does not simply constitute waste, but it may be collected, packaged and provided for reuse.

The disclosed schemes may yield a multiplicity of benefits including, but not limited to, providing a "stretchable" ink set that is compatible with being deposited on stretchable plastic materials in support of a thermoforming process, while eliminating roll offset of the ink material, which tends to be a consequent parameter of the formulations of the ink to promote the stretchability. Detailed experimentation had failed to achieve a non-offsetting ink that included the requisite stretchability.

Figure 1B:
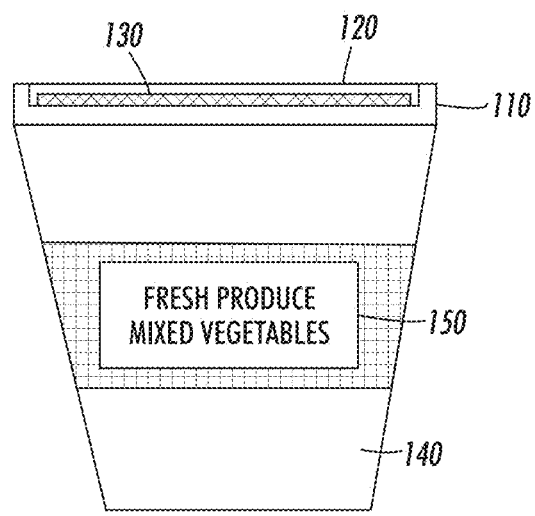

FIGS. 1A and 1B illustrate a top view and a side view, respectively, of an exemplary thermoform container 100 that may be formed from a process that advantageously employs pre-printed substrates formed and re-rolled in a manner according to this disclosure. As shown in FIGS. 1A and 1B, the exemplary thermoform container component 100 may include a shaped lid structure 110 that includes a depressed inner surface 120 of a commonly known configuration for, for example, a thermoformed container 140, having separate labeling 150, that may be usable to contain butter, margarine, sour cream or the like in a grocery configuration. A labeling 130 may also be provided. In embodiments according to this disclosure, the thermoformed container component 100 may be formed in a thermoforming process as described above and below from a thermoforming substrate material web, substantially formed of a plastic and pre-printed with the labeling 130 in a printing step in which the roll of web substrate material is unrolled printed and re-rolled. It should be noted that the depictions shown in FIGS. 1A and 1B are intended to provide only a single non-limiting example of the myriad thermoform containers and thermoform container components that may be formed according to the disclosed schemes.

FIG. 2 illustrates a schematic diagram of an exemplary image forming device 200 including a material interleaving unit according to this disclosure. As shown in FIG. 2, the exemplary image forming device 200 may include an image receiving material substrate source 220 in a form of a roll mounted in a manner that a substrate web 230 may be unwindable from the image receiving material substrate source 220. In other words, the image receiving material substrate source 220 may provide a mechanism by which the substrate web 230, preferably formed of a thermoforming grade substrate material, of which PET or PVC may comprise appropriate candidate materials, may be unwound and the substrate web 230 may be fed to and through a marking engine 210 in direction A.

In the marking engine 210, ink (or other marking material) may be deposited on the substrate web 230, and integrally or separately UV-cured on the substrate web 230, at least one of the marking and curing steps being undertaken by a material marking device 212 in the marking engine 210, and under the control of an internally-mounted, externally-mounted, or otherwise-associated controller 214. The substrate web 230 exiting the marking engine 210 in direction A may now represent a printed substrate web 230 with material inked images 240 formed and cured thereon. The printed substrate web 230 may then be rewound on a recovery source, which may be in a form of a substrate web roll rewinder 250.

In typical thermoforming work processes, it can be expected that a roll of the printed substrate web 230 may be placed in inventory, and thus it may take days before the roll of the printed substrate web 230 may ultimately be set for thermoforming in the manner described below with reference, for example, to FIG. 3. It is during this inventory period that ink offset conventionally occurs within the roll of printed substrate web 230. In discussion with thermoforming processors during the experimentation phase leading to the evolving printing concept, it was found that there were conventionally at least two pre-conditions for roll offset, or set-off, to occur in rolls of printed substrate web material. These two pre-conditions include particularly intimate contact of the marked side of the printed substrate web 230 with the backside (the non-printed side) of the printed substrate web 230 when rolled up together, and a lapse of time. In testing, it was found that roll offset may develop in as short as even only overnight, or in circumstances even sooner, depending on a formulation of the ink in its necessity to be stretchable. It was noticed that roll offset tended to get progressively more severe over a longer period of time that the intimate contact of the rolled web of printed substrate material was maintained in a rolled condition. As noted above, for food and drug packaging applications in particular, any amount of visible or otherwise detectable offset, which would, of its nature, be on a food or drug exposed side of the thermoform container component, is deemed unacceptable.

In embodiments, an additional second separate substrate web 270 has been introduced at the rewinder 250 during the rewinding process. When the printed thermoforming substrate web 230 is first attached to the core of the rewinder 250, then the second separate substrate web 270 is also attached to one of the core of the rewinder 250, or the printed thermoforming substrate web 230. Then, as the printing commences, the second separate substrate web 270 is fed in direction B from an interleaved material source 260 into the roll formed on the rewinder 250 interleaved with the printed thermoforming substrate web 230. The interleaving of the second separate substrate web 270 prevents all contact between the ink of the material inked images 240 and the backside of the printed thermoforming substrate web 230. If any ink offset were to occur, it would be between the ink of the material inked images 240 and the interleaved material.

By selecting a suitable material, such as LDPE, for forming the second separate substrate web 270, ink offset may be made less likely to occur. The roll of printed substrate web 230 will be larger in diameter because it is now composed of a multiplicity of material webs. In testing, a 0.014 inch thick PET thermoforming material substrate layer, and 0.002 inch thick LDPE interleaving material layer were used. Use of a comparatively thin interleaved material reduces cost and limits a growth in finished rewinder 250 roll diameter. In embodiments, a mechanism to support the roll of interleaved material may be as simple as a spindle with a drag brake. It may also have a simple steering or gimbal system to ensure uniform tension across a width of the second separate substrate web 270 in an effort to provide a uniform interleaving layer of material in the re-roll.

Figure 3:
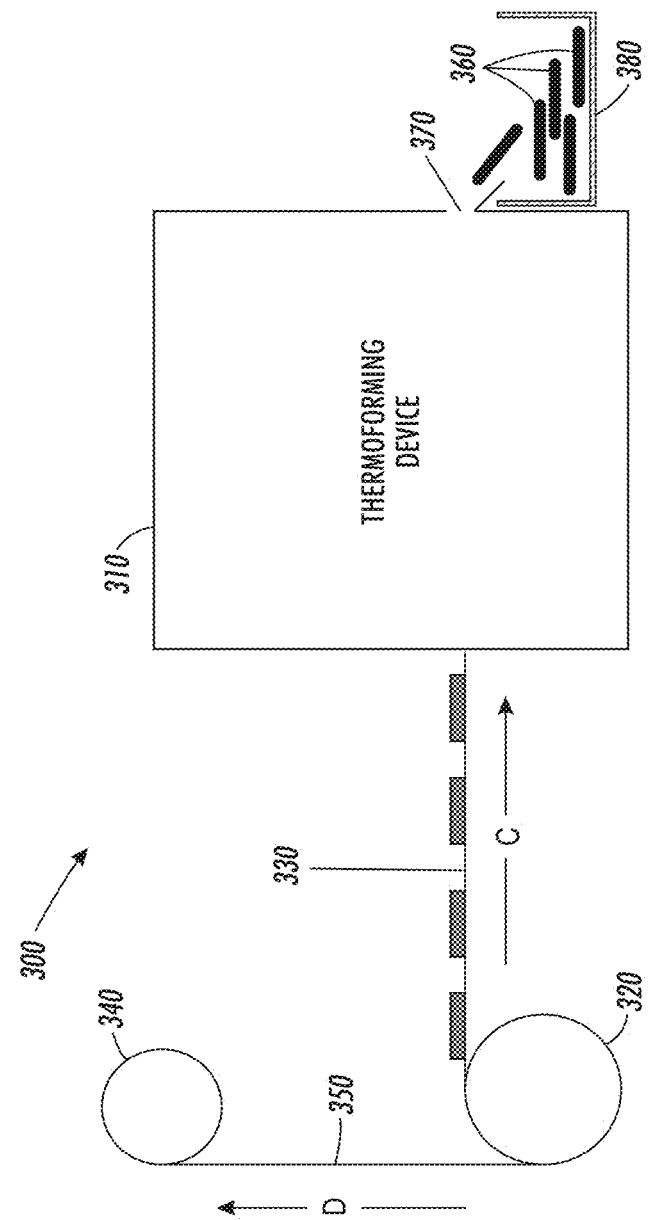
FIG. 3 illustrates a schematic diagram of an exemplary thermoforming device including an interleaving material recovery unit according to this disclosure.

FIG. 3 illustrates a schematic diagram of an exemplary thermoforming system 300 including a thermoforming device 310 and an interleaving material recovery unit 340 according to this disclosure. As shown in FIG. 3, the printed roll 320 of printed substrate web 330 with an interleave material web 350 has been removed from inventory and positioned to feed the printed substrate web 330 into the into the thermoforming device 310 in direction C. The end of the printed thermoforming substrate web 330 is first fed to the entrance of the thermoforming device 310. The end of the interleave material web 350 is next attached to a take up spool in the interleaving material recovery unit 340. The interleave material web 350 is thus removed in direction D from the printed roll 320 and rewound at the same time that the printed thermoforming substrate web 330 is fed to the thermoforming device 310 for forming a multiplicity of thermoform components 360 that may be ejected from on output port 370 in the thermoforming device 310 to be collected in an output object receptacle 380. The take up spool in the interleaving material recovery unit 340 can be separately motor-driven from the unwinder although other approaches are possible.

Results of a bench test developed as a stress for offset were conducted. In the test, a small coupon of PET was prepared with cured ink on one side. Ink was printed or applied via draw down and then appropriately cured. White ink was used for the test. The coupon was then placed on a hotplate and heated to the range of 50-60 C. A top cover was then put on the ink and "ironed on" using an elastomer roller. The result was that intimate contact was immediately achieved between ink and the top cover. The assembled coupons were set aside for three days, then the top cover was peeled off. Severe offset was seen with the PET top cover, with the failure being adhesive rather than cohesive. No offset was observed to either the LDPE or BOPP top covers.

In summary, the disclosed schemes, methods, systems, processes and/or techniques prevent ink offset from occurring within a finished roll of printed material. As indicated above, this solution was necessitated based on the inability to find alternate solutions that offer the same performance at preventing roll offset. The incremental complexity of the disclosed image forming system to enable this method is considered to be comparatively minimal with a very limited incremental cost, particularly in embodiments in which the interleaving material is collected for reuse.

Figure 4:
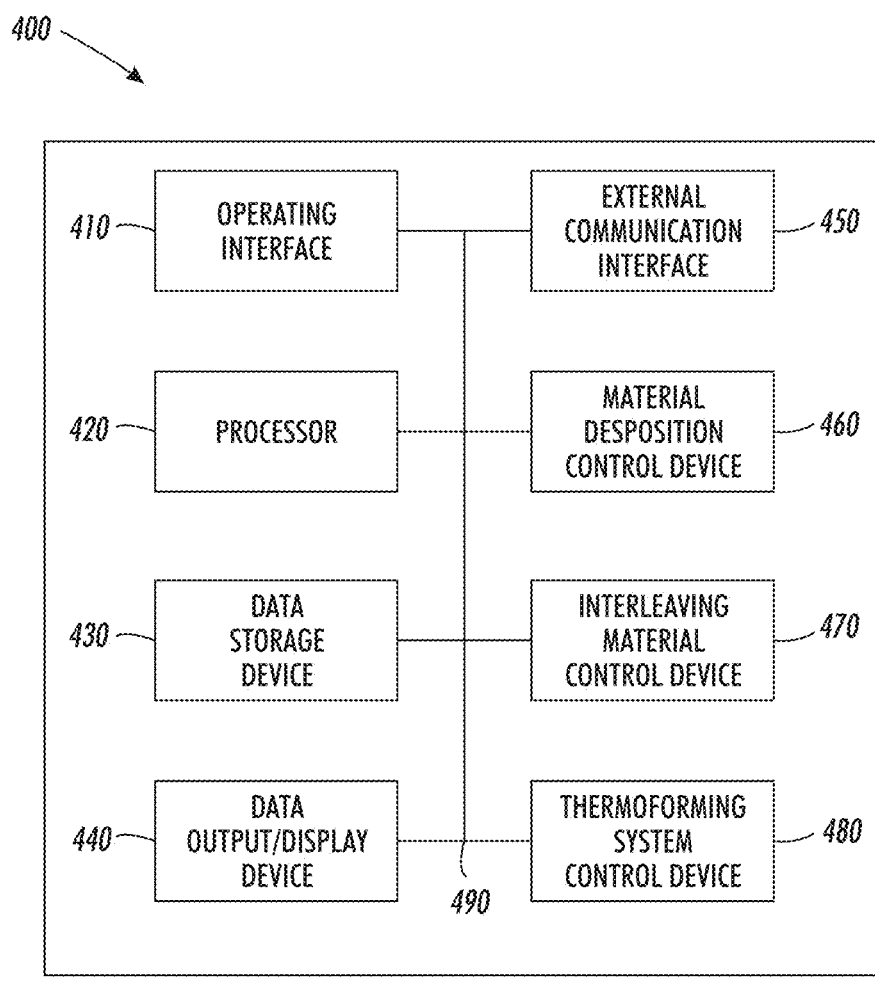
FIG. 4 illustrates a block diagram of an exemplary control system for implementing an interleaving material inclusion/recovery scheme in an exemplary image forming device and/or an exemplary thermoforming device according to this disclosure.

FIG. 4 illustrates a block diagram of an exemplary control system 400 for implementing an interleaving material inclusion/recovery scheme in an exemplary image forming device (see FIG. 2) and/or an exemplary thermoforming device (see FIG. 3) according to this disclosure.

The exemplary control system 400 may include an operating interface 410 by which a user may communicate with the exemplary control system 400. The operating interface 410 may be a locally-accessible user interface associated with the exemplary image forming device and/or the exemplary thermoforming device. The operating interface 410 may be configured as one or more conventional mechanisms common to control devices and/or computing devices that may permit a user to input information to the exemplary control system 400 and/or to a controller with which the exemplary control system is associated. The operating interface 410 may include, for example, a conventional keyboard, a touchscreen with "soft" buttons or with various components for use with a compatible stylus, a microphone by which a user may provide oral commands to the exemplary control system 400 to be "translated" by a voice recognition program, or other like device by which a user may communicate specific operating instructions to the exemplary control system 400. The operating interface 410 may be a part of a function of a graphical user interface (GUI) mounted on, integral to, or associated with, the image forming device or the thermoforming device with which the exemplary control system 400 is associated.

The exemplary control system 400 may include one or more local processors 420 for individually operating the exemplary control system 400 and for carrying into effect control and operating functions for image forming, thermoforming and/or interleaving material insertion/recovery in the image forming device or thermoforming device with which the exemplary control system 400 may be associated. Processor(s) 420 may include at least one conventional processor or microprocessor that interprets and executes instructions to direct specific functioning of the exemplary control system 400, and control of the image forming process or the thermoforming process with the exemplary control system 400.

The exemplary control system 400 may include one or more data storage devices 430. Such data storage device(s) 430 may be used to store data or operating programs to be used by the exemplary control system 400, and specifically the processor(s) 420. Data storage device(s) 430 may be used to store information regarding, for example, particular interleaving material insertion/recovery according to the disclosed schemes. The data storage device(s) 430 may include a random access memory (RAM) or another type of dynamic storage device that is capable of storing updatable database information, and for separately storing instructions for execution of system operations by, for example, processor(s) 420. Data storage device(s) 430 may also include a read-only memory (ROM), which may include a conventional ROM device or another type of static storage device that stores static information and instructions for processor(s) 420. Further, the data storage device(s) 430 may be integral to the exemplary control system 400, or may be provided external to, and in wired or wireless communication with, the exemplary control system 400, including as cloud-based storage components.

The exemplary control system 400 may include at least one data output/display device 440, which may be configured as one or more conventional mechanisms that output information to a user, including, but not limited to, a display screen on a GUI of the image forming and/or thermoforming device with which the exemplary control system 400 may be associated. The data output/display device 440 may be used to indicate to a user a status of an image forming and/or thermoforming operation respectively of an image forming device or a thermoforming device with which the exemplary control system 300 may be associated including an operation of one or more of an interleaving material insertion/recovery component.

The exemplary control system 400 may include one or more separate external communication interfaces 450 by which the exemplary control system 400 may communicate with components external to the exemplary control system 400. At least one of the external communication interfaces 450 may be configured as an output port to support connection to, and/or communication with, for example, an image forming device and/or a thermoforming device with which the exemplary control system 400 may be associated. Any suitable data connection to provide wired or wireless communication between the exemplary control system 400 and external and/or associated components is contemplated to be encompassed by the depicted external communication interface 450.

The exemplary control system 400 may include a material deposition control device 460 that may be usable to control a marking engine for depositing ink or other marketing materials, and for curing the ink or other marketing materials, on a substantially continuous web of substrate material that may be presented at an input of the marking engine in a form of a roll of such continuous web substrate material. The substantially continuous web material may be fed through the marking engine to have inked or other material images formed and cured thereon under the control of the material deposition control device 460. The substantially continuous web material may exit the marking engine and be re-rolled at an output side of the marking engine in order to constitute a roll of printed substantially continuous web material for other uses.

The exemplary control system 400 may include an interleaving material control device 470 that may be usable to provide an interleaved layer of low surface energy material at the output side of the marking engine to be re-rolled under the control of the interleaving material control device 470 between layers of the roll of printed substantially continuous web material in order to avoid roll offset, set-off, or back transfer of the image forming material to an underside of the substantially continuous web material in the manner substantially described above. The interleaving material control device 470 may control a rate at which the interleaving material is fed for inclusion in the re-rolling of the printed substantially continuous web material.

The exemplary control system 400 may include a thermoforming system control device 480. In instances in which the printed substantially continuous web material is to be used as an input for a thermoforming process, the same exemplary control system 400, through the thermoforming system control device 480, may be usable to control the thermoforming process. In such instances, either of the interleaving material control device 470 or the thermoforming system control device 480 may be usable to remove the interleaving material from the role of the printed substantially continuous web material as it is fed to the thermoforming device and to separately re-roll the interleaving material for later use.

Each of the material deposition control device 460, the interleaving material control device 470, and the thermoforming system control device 480 may operate as a part or a function of the processor 420 coupled to, for example, one or more data storage devices 430, or as one or more separate stand-alone component modules or circuits in the exemplary control system 400.

All of the various components of the exemplary control system 400, as depicted in FIG. 4, may be connected internally, and to one or more of an image forming device or a thermoforming device by one or more data/control busses 490. These data/control busses 490 may provide wired or wireless communication between the various components of the exemplary control system 400, whether all of those components are housed integrally in, or are otherwise external and connected to a the one or more of the image forming device or the thermoforming device with which the exemplary control system 400 may be associated.

It should be appreciated that, although depicted in FIG. 4 as an integral unit, the various disclosed elements of the exemplary control system 400 may be arranged in any combination of sub-systems as individual components or combinations of components, integral to a single unit, or external to, and in wired or wireless communication with the single unit of the exemplary control system 400. In other words, no specific configuration as an integral unit or as a support unit is to be implied by the depiction in FIG. 4. Further, although depicted as individual units for ease of understanding of the details provided in this disclosure regarding the exemplary control system 400, it should be understood that the described functions of any of the individually-depicted components may be undertaken, for example, by one or more processors 420 connected to, and in communication with, one or more data storage device(s) 430.

Figure 5:
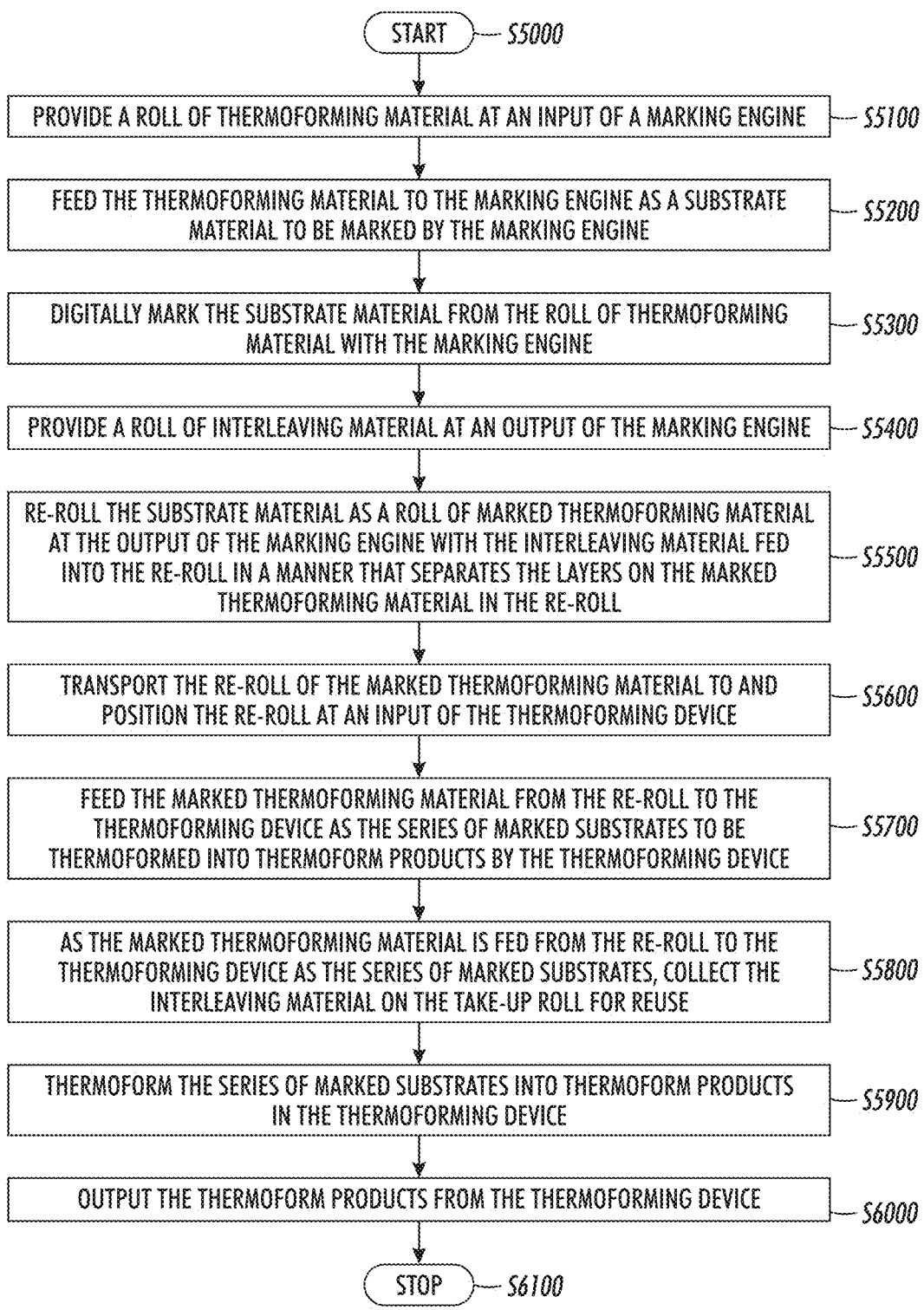
FIG. 5 illustrates a flowchart of an exemplary method for implementing an interleaving material inclusion/recovery scheme in an exemplary image forming device and/or an exemplary thermoforming device according to this disclosure.

The disclosed embodiments may include an exemplary method for implementing an interleaving material inclusion/recovery scheme in an exemplary image forming device and/or an exemplary thermoforming device. FIG. 5 illustrates a flowchart of such an exemplary method. As shown in FIG. 5, operation of the method commences at Step S5000 and proceeds to Step S5100.

In Step S5100, a roll of an input substrate material, which may be a thermoforming material, may be provided at an input of a marking engine. Operation of the method proceeds to Step S5200.

In Step S5200, the input substrate material, in a web form, may be fed to the marking engine as a substrate material to be marked by the marking engine. Operation of the method proceeds to Step S5300.

In Step S5300, the substrate material from the roll of input substrate material, in a web form, may be marked (and cured) by the marking engine in a manner that forms and fixes images thereon. In embodiments in which the input substrate material, in a web form, constitute a thermoforming material, the marking material may be in a form of an ink with a particular material composition such that the images formed by the ink or "stretchable" with expansion of the substrate material in, for example, a subsequent process for forming thermoformed output objects from the printed substrate material in a thermoforming device. The material deposition of the marking material may constitute any form of known digital image forming on the input substrate material including, but not limited to, a jetted ink material deposition or printing process. Operation of the method proceeds to Step S5400.

In Step S5400, a roll of interleaving material may be provided and positioned at an output of the marking engine. In embodiments, the interleaving material may comprise a low surface energy material in order to reduce a potential for roll offset or set-off between layers of the printed substrate material. Operation of the method proceeds to Step S5500.

In Step S5500, the printed substrate material exiting the marking engine, in a web form, may be rerolled as a roll of marked (or printed) substrate material. In the rerolling process, interleaving material may be attached to a spool of the re-roller, or to a surface of the marked (or printed) substrate material in a manner that provides for the interleaving material to be interleaved layer by layer between layers of the re-rolled marked (or printed) substrate material. Operation of the method proceeds to Step S5600.

In Step S5600, in a composite operation, the re-roll of the marked (or printed) substrate material, with the interleaved material rolled there with, may be transported to a storage component, or otherwise may be transported directly to, and positioned at an input of, a thermoforming device. Operation of the method proceeds to Step S5700.

In Step S5700, the marked (or printed) substrate material may be unrolled from the reroll and fed to an input of the thermoforming device continuously, or as a series of marked substrates by which the thermoforming device may individually produce thermoformed products to be output from the thermoforming device. Operation of the method proceeds to Step S5800.

In Step S5800, as the marked (or printed) thermoforming material substrates are fed from the reroll to an input of the thermoforming device, the interleaving material may be collected. In embodiments, the interleaving material may be simply discarded. In preferred embodiments, however, the interleaving material may be collected on one or more take-up rolls for reuse as an interleaving material in any next such image forming operation as that outlined above. Operation of the method proceeds to Step S5900.

In Step S5900, the series of marked substrates may be thermoformed into individual thermoform products in the thermoforming device. Operation of the method proceeds to Step S6000.

In Step S6000, the thermoform products may be output from the thermoforming device. Upon completion of a thermoforming operation, the reroll of the interleaving material may be relocated as appropriate for further use as described above. Operation of the method proceeds to Step S6100, where operation of the method ceases.

As indicated above, the method may positively provide a previously unachievable level of control in avoiding roll offset or set-off, or more generally the back transfer of imaging materials to a backside of an image receiving media substrate that is collected in a roll form at an exit of virtually any marking engine regardless of the potential reuse of the printed web of image receiving media substrate material.

The disclosed embodiments may include a non-transitory computer-readable medium storing instructions which, when executed by a processor, may cause the processor to execute all, or at least some, of the steps of the method outlined above.

The above-described exemplary systems and methods reference certain conventional components to provide a brief, general description of suitable operating, product processing and image forming/object forming environment in which the subject matter of this disclosure may be implemented for familiarity and ease of understanding. Although not required, embodiments of the disclosure may be provided, at least in part, as material process control components in a form of hardware circuits, firmware, or software computer-executable instructions to carry out the specific functions described. These may include individual program modules executed by processors.

Those skilled in the art will appreciate that other embodiments of the disclosed subject matter may be practiced in myriad image forming and/or object forming devices, including, for example, 3D image forming devices, of many different configurations.

As indicated above, embodiments within the scope of this disclosure may include computer-readable media storing computer-executable instructions or data structures that can be read and executed by one or more processors for controlling addressable curing. Such computer-readable media can be any available media that can be accessed by a processor, general purpose or special purpose computer. By way of example, and not limitation, such computer-readable media can comprise RAM, ROM, EEPROM, CD-ROM, flash drives, data memory cards or other analog or digital data storage device that can be used to carry or store desired program elements or steps in the form of accessible computer-executable instructions or data structures.

Computer-executable instructions include, for example, non-transitory instructions and data that can be executed and accessed respectively to cause a processor to perform certain of the above-specified functions, individually or in various combinations. Computer-executable instructions may also include program modules that are remotely stored for access and execution by a processor.

The exemplary depicted sequence of executable instructions or associated data structures represent one example of a corresponding sequence of acts for implementing the functions described in the steps of the above-outlined exemplary method. The exemplary depicted steps may be executed in any reasonable order to carry into effect the objectives of the disclosed embodiments. No particular order to the disclosed steps of the method is necessarily implied by the depiction in FIG. 5, except where a particular method step is a necessary precondition to execution of any other method step.

Although the above description may contain specific details, they should not be construed as limiting the claims in any way. Other configurations of the described embodiments of the disclosed systems and methods are part of the scope of this disclosure.

It will be appreciated that various of the above-disclosed and other features and functions, or alternatives thereof, may be desirably combined into many other different systems or applications. Also, various alternatives, modifications, variations or improvements therein may be subsequently made by those skilled in the art which are also intended to be encompassed by the following claims.

We claim:

1. A system for eliminating roll offset in previously cured printed rolled substrates, comprising:
   a first substrate material web having a printed image on a front printed side thereof cured in a pre-rolled state;
   a recovery source having a first roller component positioned at an output of a marking engine onto which the first substrate material web is rolled after being printed on the front printed side with a marking material by the marking engine and cured by the marking engine;
   an interleaved material source having a second roller component positioned proximately to the first roller component at the output of the marking engine; and
   a second substrate material web having a first portion thereof wound, in a rolled form, on the second roller component, and a second portion thereof contacting the cured printed image on the front printed side of the first substrate material web, the second portion of the second substrate material inhibiting roll offset of the cured printed image from the front side of the first substrate material web to the back side of the first substrate material web, the second substrate material web interleaved between rolled layers of the first substrate material web as the first substrate material web is rolled by the first roller component to form a composite material roll, the second substrate material web being smooth and having a second surface energy, the second surface energy being lower than a first surface energy of the first substrate material web and resisting transfer of the printed image from the first substrate material web to the second substrate material web.

2. The system of claim 1, the first substrate material web comprising a thermoforming grade plastic material.

3. The system of claim 2, the thermoforming grade plastic material being selected from a group consisting of polyester, polypropylene, polyvinyl chloride (PVC), and polyethylene terephthalate (PET).

4. The system of claim 2, the first substrate material web being printed by the marking engine depositing an ink on the first substrate material web.

5. The system of claim 4, the deposited ink image comprising an ultraviolet (UV) curable ink composition that is cured on the first substrate material web through exposure of the UV curable ink composition to UV radiation from a UV radiation source in the marking engine.

6. The system of claim 1, the second substrate material web comprising a polymer material.

7. The system of claim 6, the polymer material having a thickness less than 0.005 inches.

8. The system of claim 6, the polymer material being selected from a group consisting of low density polyethylene (LDPE) and bi-axially oriented polypropylene (BOPP).

9. The system of claim 1, the second substrate material web having a thickness less than a thickness of the first substrate material web.

10. A system for producing thermoformed objects from pre-printed cured rolled substrates, comprising:
    a thermoforming press configured to form thermoform objects from a first substrate material web;
    a composite roll of substrate material positioned proximately to the thermoforming press;
    a printed roll having a first roller component positioned at an input of the thermoforming press, the first roller component accommodating the composite roll of substrate material, the composite roll of substrate material including:
        the first substrate material web having a thermoforming grade plastic material and pre-printed cured images on a printed side of the first substrate material web, and
        a second substrate material web contacting the printed side of the first substrate material web to be interleaved between rolled layers of the first substrate material web, the second substrate material web comprising a smooth polymer material exhibiting a second surface energy, the second surface energy being lower than a first surface energy of the first substrate material web and resisting transfer of the pre-printed cured image from the first substrate material web to the second substrate material web; and
    an interleaving material recovery unit having a second roller component positioned proximately to the first roller component at the input of the thermoforming press,
    the second roller component being configured to recover the second substrate material web from the composite roll of substrate material as the first substrate material web is unrolled for feeding to an input of the thermoforming press.

11. The system of claim 10, the thermoforming grade plastic material being selected from a group consisting of polyester, polypropylene, polyvinyl chloride (PVC), and polyethylene terephthalate (PET).

12. The system of claim 10, the first substrate material web being pre-printed with a deposited ink comprising an ultraviolet (UV) curable ink composition that is cured on the first substrate material web through exposure of the UV curable ink composition to UV radiation.

13. The system of claim 12, the cured UV curable ink composition exhibiting a capacity to be stretched as the first substrate material web is stretched in a thermoforming process in the thermoforming press.

14. The system of claim 13, the cured UV curable ink composition resisting cracking or other image degradation effects in the thermoforming process.

15. The system of claim 10, the polymer material being selected from a group consisting of low density polyethylene (LDPE) and bi-axially oriented polypropylene (BOPP).

16. A method for eliminating roll offset in cured printed rolled substrates, comprising:
   forming cured printed images on a first substrate material web with a marking engine;
   recovering the first substrate material web, with the cured printed image formed thereon, by rolling the first substrate material web onto a first roller component positioned at an output of the marking engine;
   contacting an image formed side of the first substrate material web having the cured printed images thereon with a second substrate material web so that the second substrate material web is interleaved between layers of the first substrate material web as the first substrate material web is rolled by the first roller component, thereby forming a composite material roll at an output of the marking engine, the second substrate material web being smooth and having a second surface energy, the second surface energy being lower than a first surface energy of the first substrate material web and resisting transfer of the printed image from the first substrate material web to the second substrate material web.

17. The method of claim 16, the first substrate material web comprising a thermoforming grade plastic material.

18. The method of claim 17, the thermoforming grade plastic material being selected from a group consisting of polyester, polypropylene, polyvinyl chloride (PVC), and polyethylene terephthalate (PET).

19. The method of claim 17, the forming step further comprising printing an image on the first substrate material web with the marking engine depositing an ink on the first substrate material web, the deposited ink comprising an ultraviolet (UV) curable ink composition, and curing the UV curable ink composition on the first substrate material web through exposure of the UV curable ink composition to UV radiation from a UV radiation source in the marking engine.

20. The method of claim 16, the second substrate material web comprising a polymer material.

21. The method of claim 20, the polymer material being selected from a group consisting of low density polyethylene (LDPE) and bi-axially oriented polypropylene (BOPP).

22. The method of claim 17, further comprising:
   mounting the composite roll on a third roller component positioned at an input of a thermoforming press;
   unrolling the composite roll from the third roller component;
   feeding the first substrate material web to an input of the thermoforming press; and
   collecting the second substrate material with a fourth roller component positioned proximately to the third roller component at the input of the thermoforming press as the first substrate material web is unrolled for feeding to the input of the thermoforming press.

23. The method of claim 22, the cured UV curable ink composition exhibiting a capacity to be stretched as the first substrate material web is stretched in a thermoforming process in the thermoforming press.

24. The method of claim 23, the cured UV curable ink composition resisting cracking or other image degradation effects in the thermoforming process.

* * * * *